United States Patent Office 3,337,221
Patented Aug. 22, 1967

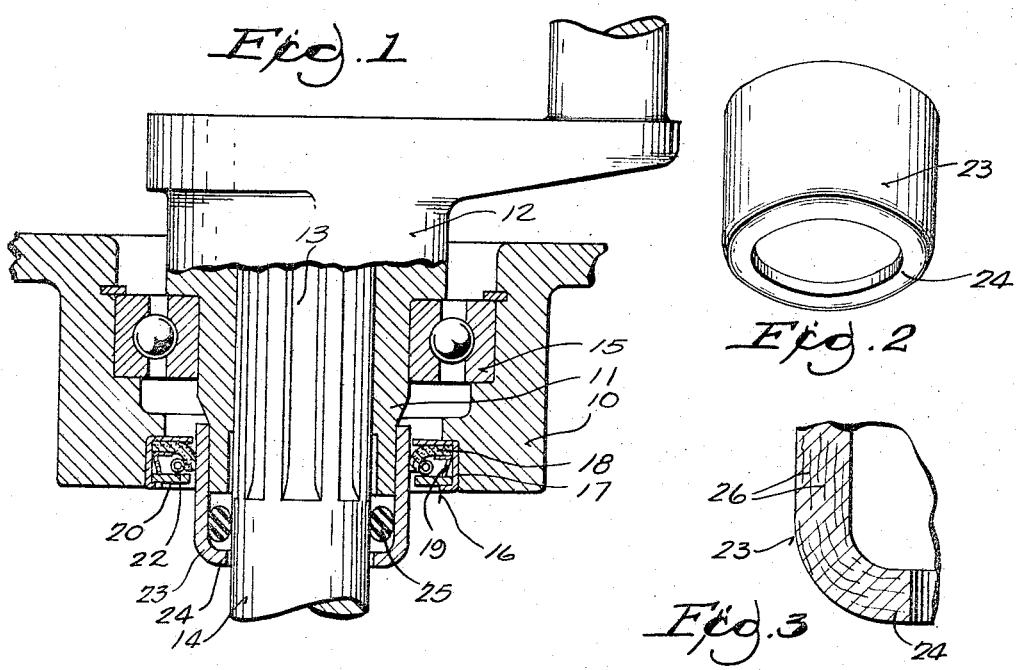
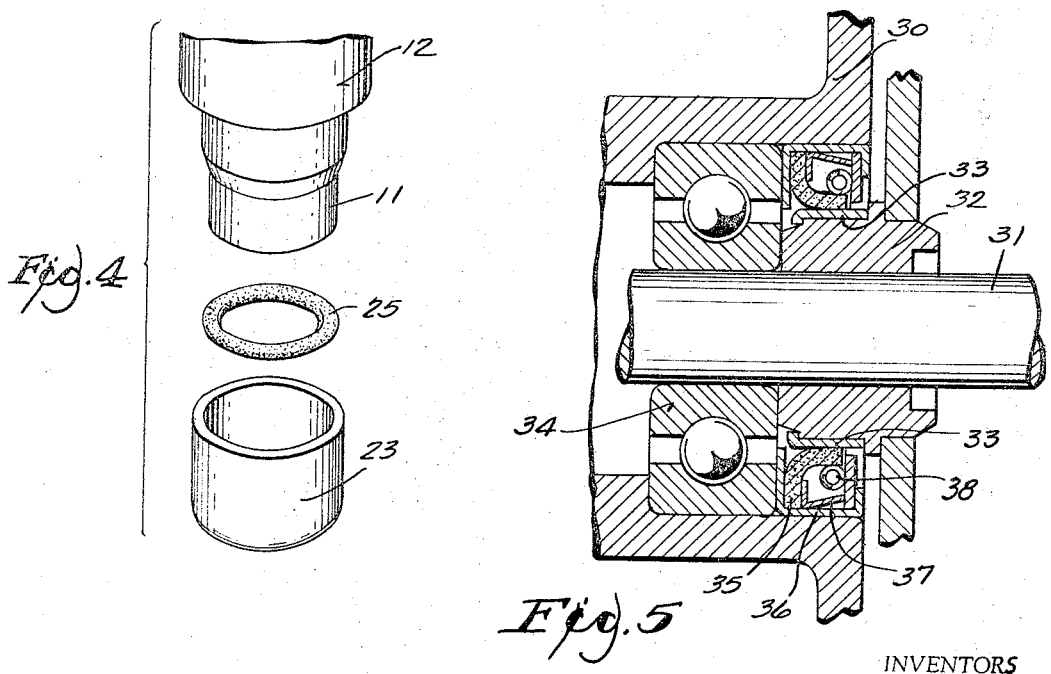

3,337,221
SEAL HAVING A DRAWN THIN WALLED
WEAR SLEEVE
Richard P. Hulsebus, Waukegan, and John H. Koerber, McHenry, Ill., assignors to Outboard Marine Corporation, Waukegan, Ill., a corporation of Delaware
Filed Nov. 5, 1964, Ser. No. 409,187
2 Claims. (Cl. 277—8)

This invention relates to a seal having a drawn, thin walled, wear sleeve.

While wear sleeves are old per se, prior wear sleeves have been machined circumferentially. When such a prior art sleeve is applied with a press fit to the hub of a rotor, the pressure produces an unfavorable stress pattern which reduces the durability and life of the sleeve and may cause the sleeve to fracture.

In accordance with the present invention, a wear sleeve is fabricated by working of the metal, as by drawing or extruding the sleeve. Accordingly, the flow line or grain structure or pattern of the metal will be disposed in such direction as to be resistant to the forces which result when the sleeve is pressed onto the rotor hub. In general, the resulting grain structure is believed to be primarily oriented in a direction axially of the sleeve. As a consequence, the walls of the resulting sleeve are better capable of withstanding the stresses of a press fit assembly. Deformation is avoided and the sleeve is durable and has a long life. For this reason the walls of sleeves embodying the present invention can be made thinner than those of the prior art, and still be more durable and less subject to deformation.

Moreover, drawn sleeves embodying the present invention may be hardened or provided with a special surface finish used to promote sealing performance. In some applications they may be composed of corrosion resistant metal. These features are incorporated in the sleeve itself, thus making it unnecessary to apply any special treatment to the rotor hub covered by the wear sleeve. The hub may be made of material ideal for its purpose, for example, free cutting machine steel.

Other objects, features, and advantages of the present invention will appear from the following disclosure in which:

FIGURE 1 is a fragmentary axial cross section taken through one embodiment of seal embodying the present invention;

FIGURE 2 is a perspective view of a wear sleeve drawn in accordance with the present invention;

FIGURE 3 is a fragmentary axial cross section taken through the sleeve and showing the flow line or grain of the metal in the sleeve wall;

FIGURE 4 is a view in spaced apart relationship of the rotor hub, O-ring and wear sleeve;

FIGURE 5 is a fragmentary axial cross section taken through another embodiment of the present invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The structure shown in FIGURES 1 through 4 relates to the embodiment of the present invention in a seal between a housing 10 and the rotor hub 11 on the crankshaft or member 12 of an outboard motor. Rotor hub 11 rotates relative to housing or member 10. The crankshaft 12 is coupled to the driveshaft or member 14 by means in the form of splines 13. Crankshaft 12 and hub 11 are rotatably supported on the housing by ball bearing 15. Bearing 15 is sealed by the seal structure shown at 16. The seal 16 comprises an inwardly facing channel ring 17 containing therein an elastomeric annular gasket 18 which is held in place by spacer ring 19 and annular washer 20. The inner margin of the gasket 18 is bent axially under pressure of the wear sleeve 23 and is biased against the wear sleeve 23 by contractile spring 22. Sleeve 23 has a press fit with the hub 11 to turn therewith with respect to the housing 10 which is stationary.

Wear sleeve 23 is annular in transverse cross section and is cup-shaped in that one end thereof is provided with a turned in lip 24 to confine O-ring gasket 25 which functions as a static seal between the driveshaft 14 and the sleeve 23.

As typically used in outboard motors, seal 16 is subject to the corrosive influence of exhaust gasses, sea water, etc., which are present about the driveshaft 14.

Rotor hub 11 is desirably fabricated of a free cutting machine steel which is machined to its specified outer diameter. Sleeve 23 is fabricated by mechanical working as by drawing the sleeve axially on a conventional drawing press. The drawing operation is believed to produce, in the wall of the sleeve 23, flow lines or grain structure indicated by reference character 26. As shown, the grain structure 26 is believed to be primarily oriented in the direction parallel to the sleeve axis. Production of such a grain structure is inherent in the drawing procedure but is believed to be completely new in a thin walled wear sleeve as applied to a seal as herein disclosed.

As indicated in FIGURE 4, sleeve 23 is applied to the hub 11 by pressing it axially thereon. The internal diameter of the sleeve 23 is desirably a few thousandths of an inch smaller than the external diameter of the hub 11. The pressing operation is thought to produce both axial and circumferential stresses in the annular mating surface of the sleeve, with some minor accommodation of the sleeve to the hub. The sleeve of the present invention is particularly adapted to withstand these stresses because of the grain structure resulting from the working of the metal. This is a marked departure from prior art sleeve constructions in which the wear sleeve is fabricated in a machining operation. Such prior art wear sleeves are characterized by frequent wall failure during the pressing operation, short life and low durability.

In contrast to such prior art sleeves, the wear sleeve of the present invention is much better able to withstand the stresses imposed by pressing it on the hub 11. The sleeve is more durable and has a longer life.

All of the seal wear occurs between the wear sleeve 23 and the gasket 18. To enable the wear sleeve 23 to withstand this service, it is desirably metallurgically hardened after drawing. Where the environment is corrosive, the sleeve is desirably made of a corrosion resistant material, such as stainless steel. Typical corrosive environments are sea water, streams and lakes contaminated by industrial wastes and corrosive chemicals.

FIGURE 5 shows a modified embodiment. This figure illustrates the seal applied between the housing wall 30 of a pump and the hub 32 of driveshaft 31. Drawn wear sleeve 33 is pressed onto the hub 32. Shaft 31 is rotatably supported on the housing wall 30 by an anti-friction bearing 34. The sealing structure is the same as shown in FIGURES 1 through 4 and includes a sealing gasket 35 mounted in a channel shaped support ring 36. The gasket is shaped by the shaping ring 37 and is biased into engagement with the wear ring 33 by the contractile spring 38.

As in the embodiment shown in FIGURES 1 through 4, the wear ring 33 is fabricated by a conventional drawing procedure to produce a grain structure or pattern as generally shown at 26 in FIGURE 3. Accordingly, when sleeve 33 is pressed upon the slightly oversized hub 32, the stresses thereon induced will be effectively resisted by the grain structure of the sleeve 33, as aforestated.

The term "thin walled" sleeve as used herein is applied to a sleeve in which the percentage ratio of the wall thickness to sleeve diameter does not exceed 5 percent and may be as low as 2 percent or 3 percent.

Fabrication of the final sleeve product by drawing or other working process, as compared to a machining or cutting process, appears to be essential to the achievement of the improved results. These results are not achieved if the final sleeve product is produced by machining or cutting, even if some prior fabrication step would be expected to result in a grain structure or pattern which is axially oriented in the resulting sleeve wall. It may be that any final machining step disturbs the grain structure pattern and thereby weakens the metal's ability to withstand the stresses induced during the press fit assembly. Possibly the working or drawing operation has some beneficial metallurgical effect other than simply to produce grain structure or pattern which is believed to be primarily axially oriented. In any event, an improved wear sleeve is produced by drawing the final sleeve product even though the full reasons for such advantageous results are not completely understood.

Various of the features of the invention are set forth in the following claims.

What is claimed is:

1. The combination of a first member adapted to be mounted for rotation, a second member adapted to be mounted for rotation, means on said first and second members for coupling said members for rotation about a common axis, an axially drawn sleeve telescoped onto said second member, said sleeve having a grain extending in the direction of the telescopic relation between said sleeve and said second member, said sleeve extending in the direction of the telescopic relation away from said second member and beyond said coupling means, a first seal between said sleeve and said first member, means cooperating with said sleeve to retain said first seal between said sleeve and said first member, a third member relative to which said second member is rotatable, and a second seal extending between said sleeve and said third member.

2. The combination of a first member adapted to be mounted for rotation, a second member adapted to be mounted for rotation, means on said first and second members for coupling said members for rotation about a common axis, a sleeve telescoped onto said second member, said sleeve having a grain extending in the direction of the telescopic relation between said sleeve and said second member, said sleeve extending in the direction of the telescopic relation away from said second member and beyond said coupling means, a first seal between said sleeve and said first member, means cooperating with said sleeve to retain said first seal between said sleeve and said first member, a third member relative to which said second member is rotatable, and a second seal extending between said sleeve and said third member.

References Cited

UNITED STATES PATENTS

| | | | |
|---|---|---|---|
| 1,337,656 | 4/1920 | Kasper | 308—179 |
| 1,496,236 | 6/1924 | Laughlin | 64—23 |
| 2,990,220 | 6/1961 | Malone | 277—65 |
| 3,034,840 | 5/1962 | Gammon et al. | 308—237 X |
| 3,072,413 | 1/1963 | Parks | 277—8 |
| 3,214,180 | 10/1965 | Hudson et al. | 277—37 |

SAMUEL ROTHBERG, *Primary Examiner.*